(12) United States Patent
Robichaud (10) Patent No.: US 12,472,068 B2
(45) Date of Patent: Nov. 18, 2025

(54) METHOD FOR DESIGNING A PATIENT-SPECIFIC IMPLANT AND PATIENT-SPECIFIC IMPLANT

(71) Applicant: LABORATOIRES BODYCAD INC., Québec (CA)

(72) Inventor: Jean Robichaud, St-Aubert (CA)

(73) Assignee: LABORATOIRES BODYCAD INC., Québec (CA)

( * ) Notice: Subject to any disclaimer, the term of this patent is extended or adjusted under 35 U.S.C. 154(b) by 1113 days.

(21) Appl. No.: 17/245,384

(22) Filed: Apr. 30, 2021

(65) Prior Publication Data

US 2021/0338432 A1   Nov. 4, 2021

Related U.S. Application Data

(60) Provisional application No. 63/018,739, filed on May 1, 2020.

(51) Int. Cl.
*A61F 2/30*   (2006.01)
*A61F 2/38*   (2006.01)

(52) U.S. Cl.
CPC .......... *A61F 2/3094* (2013.01); *A61F 2/389* (2013.01); *A61F 2002/3096* (2013.01); *A61F 2002/30985* (2013.01)

(58) Field of Classification Search
None
See application file for complete search history.

(56) References Cited

U.S. PATENT DOCUMENTS

2014/0228860 A1*  8/2014  Steines .................. A61B 34/10
                                                       606/130

* cited by examiner

*Primary Examiner* — Melanie R Tyson
*Assistant Examiner* — Melissa A Hoban
(74) *Attorney, Agent, or Firm* — MARSHALL, GERSTEIN & BORUN LLP (57) ABSTRACT

A method for designing a patient-specific implant is provided. The method includes the steps of obtaining a 3D model of at least an articulation portion of a patient's bone, virtually cutting the articulation portion of the 3D model of the patient's bone for defining a resected bone surface having a resected surface area, selecting an implant from a library of standard implants based on the 3D model, virtually engaging the bone-contacting surface of the selected implant with the resected bone surface, designing an implant peripheral portion configured to extend from the selected implant and conform to the 3D model and virtually combining the selected implant and designed implant perimeter to create a 3D model of the patient-specific implant.

12 Claims, 3 Drawing Sheets

FIG. 4

METHOD FOR DESIGNING A PATIENT-SPECIFIC IMPLANT AND PATIENT-SPECIFIC IMPLANT

CROSS-REFERENCE TO RELATED APPLICATIONS

This application claims priority under 35 USC § 119(e) of US Provisional Application No. 63/018,739, filed May 1, 2020, entitled "METHOD FOR DESIGNING A PATIENT-SPECIFIC IMPLANT AND PATIENT-SPECIFIC IMPLANT", the entirety of which is hereby incorporated by reference.

TECHNICAL FIELD

The technical field generally relates to a method of designing implants. More particularly, it relates to a method of designing patient-specific implants and the patient-specific implants obtained.

BACKGROUND

Designing implants which aim to replace, or repair damages to a portion of a bone and/or joint can be costly and time consuming. The installation of an implant traditionally includes the resection or removal of at least a portion of a bone or joint. The resected bone surface is then covered by the implant to repair the corresponding bone or joint.

It is thus appreciated that each patient requires a custom implant to fit the shape and size of their bones and joints, and that depending on the location of the damaged area (e.g., knee, hip, shoulder, etc.), designing the custom implant can require additional time and/or expertise. Existing tools and procedures are not adapted to create efficient implants customized for each particular patient, and for various locations of a human body. There is therefore much room for improvement.

SUMMARY

According to an aspect, there is provided a method for designing a patient-specific implant for a patient's bone. The method includes obtaining a 3D model of at least an articulation portion of the patient's bone; virtually cutting the 3D model of the articulation portion of the patient's bone for defining a resected bone surface having a resected bone perimeter delimitating a resected surface area; providing a library of standard implants wherein each one of the standard implants is characterized by a lateral surface and a bone-contacting surface, the bone-contacting surface being delimited by a bone-contacting perimeter defining a bone-contacting surface area and the lateral surface extending between the bone-contacting perimeter and an outer surface perimeter; selecting a standard implant from the library of standard implants based on the 3D model in a manner such that the bone-contacting surface area of the selected standard implant is smaller than the resected surface area of the resected bone surface; virtually superposing the bone-contacting surface area of the selected standard implant to the resected bone surface of the articulation portion of the patient's bone in a manner such that the bone-contacting perimeter of the bone-contacting surface of the selected standard implant is aligned with or located inwardly of the resected bone perimeter; designing a custom implant peripheral portion configured to extend peripherally from the selected standard implant virtually engaged with the articulation portion of the patient's bone, the custom implant peripheral portion extending from the lateral surface of the selected standard implant to the resected bone perimeter; and virtually combining the selected standard implant and the designed custom implant peripheral portion to create a 3D model of the patient-specific implant.

According to a possible embodiment, the step of virtually superposing the bone-contacting surface area of the selected standard implant to the resected bone surface of the articulation portion includes adjusting an orientation of the selected standard implant relative to at least one of the resected bone surface, an adjacent bone and an adjacent implant.

According to a possible embodiment, the patient's bone is a tibial bone, and the selected standard implant is a tibial component of a knee replacement implant.

According to a possible embodiment, the patient-specific implant is manufactured as a one-piece unit.

According to a possible embodiment, the patient-specific implant is manufactured via an additive manufacturing process based on the created 3D model of the patient-specific implant.

According to a possible embodiment, the patient-specific implant is manufactured via a milling process based on the created 3D model of the patient-specific implant.

According to a possible embodiment, designing the custom implant peripheral portion includes designing the custom implant peripheral portion to cover the lateral surface of the selected standard implant.

According to a possible embodiment, designing the custom implant peripheral portion includes covering an exposed resected bone surface extending between the bone-contacting perimeter of the selected standard implant virtually superposed to the resected bone surface and the resected bone perimeter.

According to a possible embodiment, designing the custom implant peripheral portion includes adjusting a curvature of an exposed implant surface of the custom implant peripheral portion, the exposed implant surface extending between the outer surface perimeter of the selected standard implant virtually superposed to the resected bone surface and the resected bone perimeter.

According to another aspect, there is provided a computer system configured to obtain a 3D model of at least an articulation portion of a patient's bone; virtually cut the 3D model of the articulation portion of the patient's bone to define a resected bone surface having a resected bone perimeter delimitating a resected surface area; provide a library of standard implants wherein each one of the standard implants is characterized by a lateral surface and a bone-contacting surface, the bone-contacting surface being delimited by a bone-contacting perimeter defining a bone-contacting surface area and the lateral surface extending between the bone-contacting perimeter and an outer surface perimeter; select a standard implant from the library of standard implants based on the 3D model in a manner such that the bone-contacting surface area of the selected standard implant is smaller than the resected surface area of the resected bone surface; virtually superpose the bone-contacting surface area of the selected standard implant to the resected bone surface of the articulation portion of the patient's bone in a manner such that the bone-contacting perimeter of the bone-contacting surface of the selected standard implant is aligned with or located inwardly of the resected bone perimeter; design a custom implant peripheral portion configured to extend peripherally from the selected standard implant virtually engaged with the articulation portion of the patient's bone, the custom implant peripheral portion extending from the lateral surface of the selected standard implant to the resected bone perimeter; virtually combine the selected standard implant and the designed custom implant peripheral portion to create a 3D model of a patient-specific implant; and transmit instructions to a manufacturing device to manufacture the patient-specific implant.

According to a possible embodiment, the computer system further includes a user interface device for receiving commands from a user to adjust the patient-specific implant.

According to another aspect, there is provided a non-transitory computer-readable medium having instructions stored thereon which, when executed by a computer, cause the computer to perform the steps of: obtaining a 3D model of at least an articulation portion of a patient's bone; virtually cutting the 3D model of the articulation portion of the patient's bone for defining a resected bone surface having a resected bone perimeter delimitating a resected surface area; providing a library of standard implants wherein each one of the standard implants is characterized by a lateral surface and a bone-contacting surface, the bone-contacting surface being delimited by a bone-contacting perimeter defining a bone-contacting surface area and the lateral surface extending between the bone-contacting perimeter and an outer surface perimeter; selecting a standard implant from the library of standard implants based on the 3D model in a manner such that the bone-contacting surface area of the selected standard implant is smaller than the resected surface area of the resected bone surface; virtually superposing the bone-contacting surface area of the selected standard implant to the resected bone surface of the articulation portion of the patient's bone in a manner such that the bone-contacting perimeter of the bone-contacting surface of the selected standard implant is aligned with or located inwardly of the resected bone perimeter; designing a custom implant peripheral portion configured to extend peripherally from the selected standard implant virtually engaged with the articulation portion of the patient's bone, the custom implant peripheral portion extending from the lateral surface of the selected standard implant to the resected bone perimeter; virtually combining the selected standard implant and the designed custom implant peripheral portion to create a 3D model of a patient-specific implant; and transmitting instructions to a manufacturing device to manufacture the patient-specific implant.

According to still another aspect, there is provided a method for designing a patient-specific implant. The method includes: obtaining a 3D model of at least an articulation portion of a patient's bone; virtually cutting the articulation portion of the 3D model of the patient's bone for defining a resected bone surface having a resected surface area; selecting an implant from a library of standard implants based on the 3D model, the implant having a bone-contacting surface being delimited by a bone-contacting perimeter defining a bone-contacting surface area; virtually engaging the bone-contacting surface of the selected implant with the resected bone surface; designing an implant peripheral portion configured to extend peripherally from the selected implant and conform to the 3D model; and virtually combining the selected implant and designed implant perimeter to create a 3D model of the patient-specific implant.

According to a possible embodiment, the bone-contacting surface area of the selected implant is smaller than the resected surface area.

According to a possible embodiment, virtually engaging the selected implant with the resected bone surface includes positioning the selected implant such that the bone-contacting surface is contained within the resected surface area, thereby defining an exposed resected bone surface between the bone-contacting perimeter and a perimeter of the resected bone surface and wherein designing the implant peripheral portion includes covering the exposed resected bone surface.

According to a possible embodiment, positioning the selected implant includes adjusting an orientation of the implant relative to at least one of the resected bone surface, an adjacent bone and an adjacent implant.

According to a possible embodiment, virtually positioning the selected implant includes adjusting a height of the selected implant relative to at least one of the resected bone surface, an adjacent bone and an adjacent implant.

According to a possible embodiment, the patient's bone is a tibial bone and the articulation portion is at least a portion of a knee, and wherein the selected implant is a tibial component of a knee replacement implant.

According to a possible embodiment, the patient-specific implant is manufactured as a one-piece unit.

According to a possible embodiment, the patient-specific implant is manufactured via an additive manufacturing process based on the created 3D model of the patient-specific implant.

According to a possible embodiment, the patient-specific implant is manufactured via a milling process based on the created 3D model of the patient-specific implant.

According to a possible embodiment, designing the implant peripheral portion includes designing the implant peripheral portion to cover a lateral surface of the selected implant.

According to a possible embodiment, designing the implant peripheral portion includes adjusting a curvature of an exposed implant surface of the implant peripheral portion, the exposed implant surface extending between an outer surface perimeter of the selected implant virtually engaged with the resected bone surface and a resected bone perimeter delimitating the resected surface area.

DETAILED DESCRIPTION

In the following description, the same numerical references refer to similar elements. In addition, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Furthermore, although the various exemplary embodiments and corresponding methods described herein may be used in relation with a tibial and/or femoral implant, for example, it is understood that it may be used with other types of implants and/or for other purposes. For this reason, the term "implant" as used herein should not be taken as to limit the scope of the present disclosure as being used with tibial and femoral implants in particular. It should be understood that the term "implant" should, in the context of the present disclosure, encompass all other types of implants with which the described embodiments and methods could be used and may be useful.

In addition, although the optional configurations as illustrated in the accompanying drawings comprise various components and although the optional configurations of the implant as shown may consist of certain configurations as explained and illustrated herein, not all of these components and configurations are essential and thus should not be taken in their restrictive sense, i.e. should not be taken as to limit the scope of the present disclosure. It is to be understood that other suitable components and cooperations thereinbetween, as well as other suitable configurations may be used for the implants, and corresponding design methods, as briefly explained, and as can be easily inferred herefrom, without departing from the scope of the disclosure.

As will be described below in relation with various possible embodiments, a patient-specific implant and its corresponding designing method is provided. Broadly described, the method includes the customization of a standard implant for conforming with a patient's bone, thus creating the patient-specific implant. More particularly, the method includes the customization of a peripheral portion of a standard implant or to the peripheral addition of a customized peripheral portion to a standard implant, in order to conform to the bone or joint of the patient.

Figure 1:
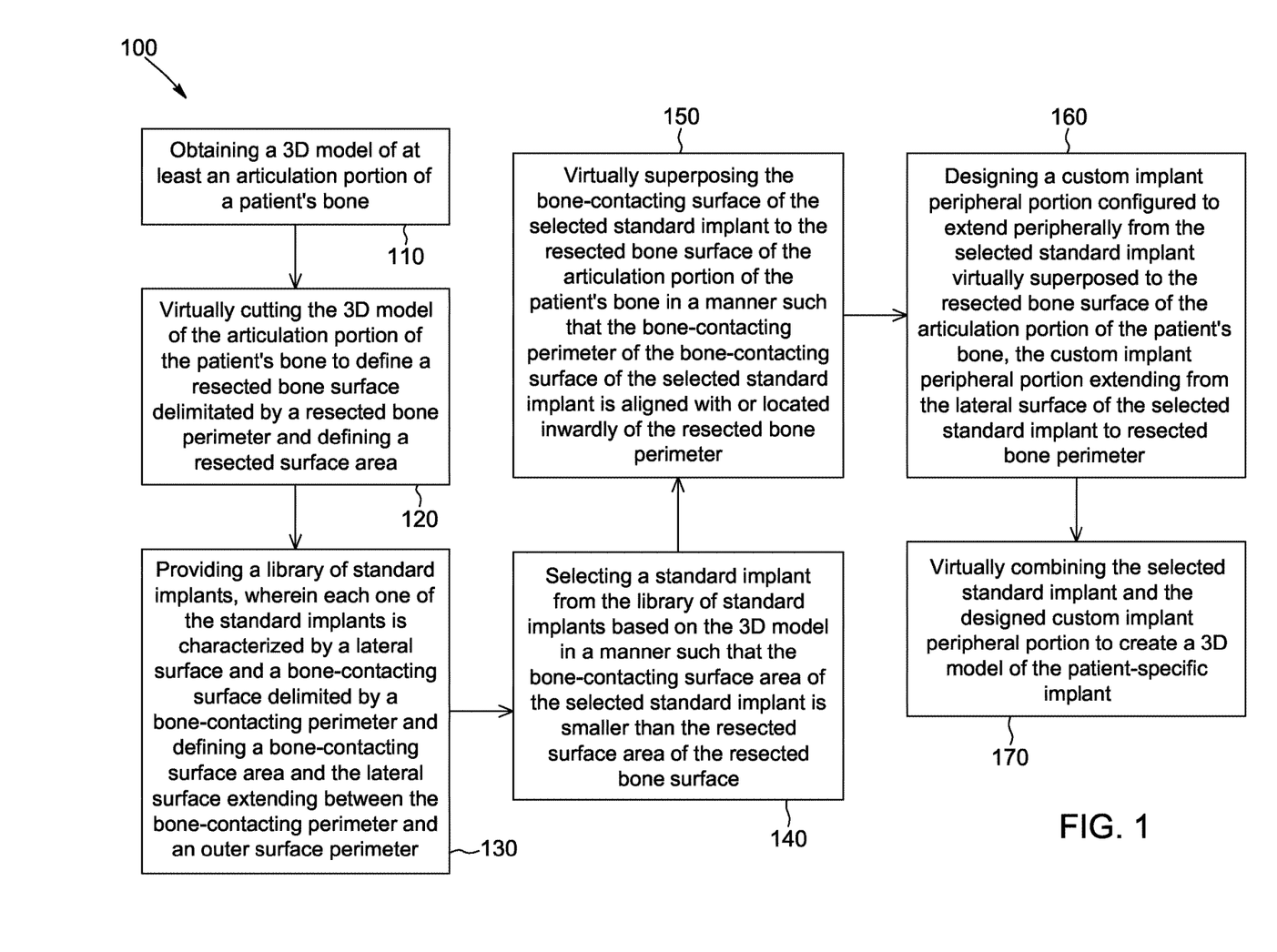
FIG. 1 is a flow chart illustrating a method for designing a patient-specific implant, according to an embodiment.

With reference to FIG. 1, a patient-specific implant designing method 100 is shown according to an embodiment. The method 100 includes a first step 110 of obtaining a 3D model of a patient's bone, or at least an articulation portion (e.g., a portion of a joint) of the bone. In some embodiments, the 3D model is created using any known and/or suitable medical imaging techniques, such as via x-rays (e.g., CT scans) or via magnetic fields and radio frequency pulses (e.g., MRI scans). It may be required to assemble the images to construct the 3D model which describes the structure of the patient's bones, including their shapes, surfaces, and/or volumes, among other parameters.

Once the 3D model is obtained, the method includes a second step 120 of virtually cutting the 3D model of the articulation portion of the patient's bone (i.e. perform virtually a bone resection) for defining a resected bone surface shaped and configured to eventually receive the patient-specific implant. In an embodiment, the resected bone surface is substantially planar. In another embodiment, the resected bone surface includes at least two substantially planar sections, each one having a different orientation. As will be further described below, it should be noted that the resected bone surface has a resected surface area delimited by a resected bone perimeter. After having virtually resected the bone, the method includes a third step 130 of providing a library, or database, of standard implants related to the resected bone surface. For example, and as will be described further below, if the resected bone surface is located on the tibia, proximate the knee (i.e. the proximal end), the library of standard implants will include standard implants for tibial components of a knee replacement implant. Each one of the standard implants in the library is characterized by an outer surface delimitated by an outer surface perimeter, and a bone-contacting surface delimitated by a bone-contacting perimeter and defining a bone-contacting surface area.

A fourth step 140 of the designing method 100 includes selecting a standard implant from the provided library of standard implants. The selection is based on the 3D model of the bone whereby the bone-contacting surface area of the selected standard implant can be smaller than the resected surface area of the resected bone surface of the patient's bone. Once selected, a fifth step 150 includes virtually superposing the bone-contacting surface of the selected standard implant to the resected bone surface of the patient's bone. The selected implant is superposed in a manner such that the bone-contacting perimeter of the bone-contacting surface is aligned with or located inwardly of the resected bone perimeter. Therefore, it should be understood that a portion of the resected surface area remains exposed once the selected implant is virtually superposed thereon.

The method 100 further includes a sixth step 160 of designing a custom implant peripheral portion configured to extend peripherally from the selected standard implant which has been previously virtually engaged with the patient's bone (i.e., superposed to the resected bone surface of the articulation portion of the bone). The custom implant peripheral portion can extend from a lateral surface of the selected implant, extending between the outer surface perimeter and the bone-contacting perimeter of the selected implant, to the resected bone perimeter, thus covering the exposed resected bone surface area previously defined at step 150. The custom implant peripheral portion can be designed, based on the initial 3D model of the bone, to be in register with the corresponding portion of the patient's bone.

Finally, the method 100 includes a seventh step 170 of virtually combining the selected standard implant and the designed custom implant peripheral portion in order to create a 3D model of the patient-specific implant. It is appreciated that, once designed, the 3D model of the patient-specific implant can be used to manufacture the implant using any suitable method and/or tools.

Figure 2:
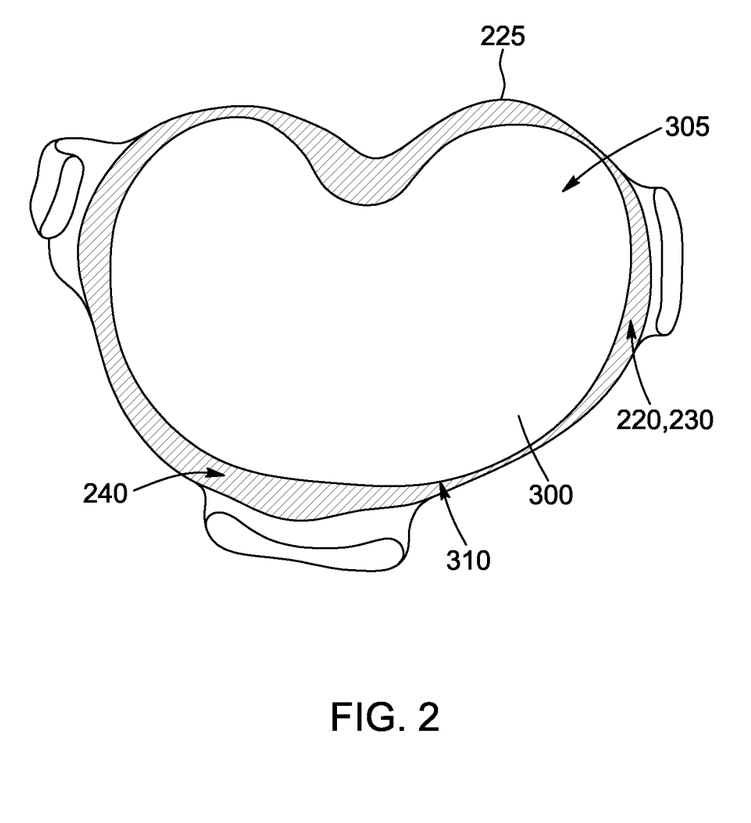
FIG. 2 is a schematic top cross-sectional view of a standard implant superposed on a resected bone surface, according to an embodiment.
Figure 3:
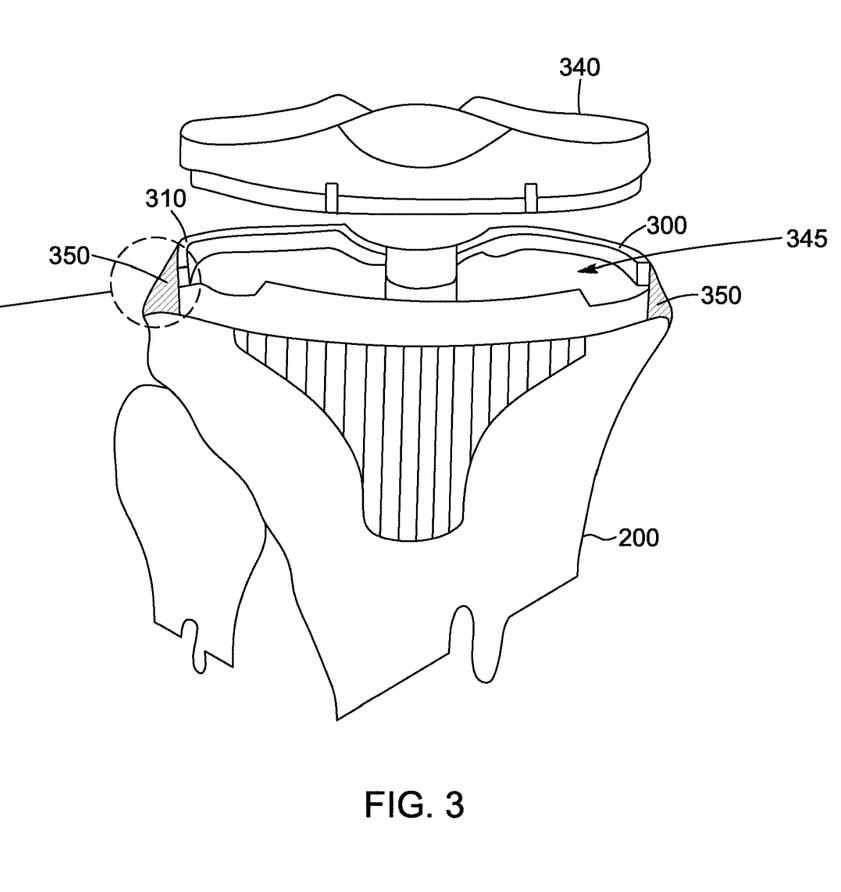
FIG. 3 is a front view of a standard implant positioned relative to a bone and an adjacent implant, according to an embodiment.
Figure 4:
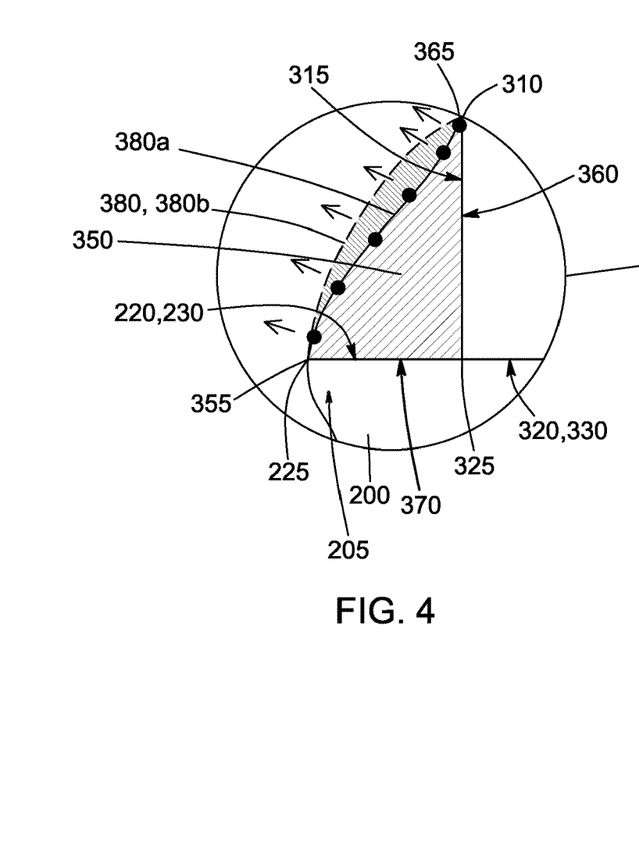
FIG. 4 is a cross-sectional view, enlarged, of a peripheral portion of the patient-specific implant shown in FIG. 3, the peripheral portion covering an exposed surface area of the resected bone surface, according to an embodiment.

Referring to FIGS. 2 to 4, in addition to FIG. 1, an exemplary implementation of the above-described method is illustrated for the replacement and repair of a patient's knee. More specifically, in the illustrated implementation, the patient-specific implant is a tibial implant, such as a tibial component of a knee replacement implant. Therefore, the first step 110 of the designing method 100 includes obtaining a 3D model of the patient's tibia bone 200, and more particularly of the proximal portion of the patient's tibia bone (i.e., at the upper end of the tibia bone 200 proximate the knee). As mentioned above, the 3D model can be constructed, for example, by using different types of medical imaging techniques, such as a CT scan, to acquire images of the patient's bones, and assembling said images to form a 3D model which describes the structure of the patient's bones, including their shapes, surfaces, and/or volumes, among other parameters.

The second step 120 of the method includes virtually cutting the created 3D model of the patient's tibia. For example, in some embodiments, a computer program can be adapted to perform the virtual cuts of the 3D model and define a resected bone surface 220. The computer program can determine a shape, position, orientation, depth, etc. of a single or biplanar cut to be formed in the patient's bone to create the required resected bone surface 220. In this embodiment, the tibial plateau of the patient's tibia is resected via a single cut to create a single substantially planar resected bone surface 220. In other words, and as seen in FIGS. 2 to 4, the resected bone surface 220 extends across the entire diameter of the tibial plateau, although it is appreciated that other configurations of the resected bone surface are possible. For example, a portion of the tibial plateau can be resected, leaving the remaining portion uncut. Furthermore, in this embodiment, the resected bone surface 220 has a resected surface area 230 which delimitates a resected bone perimeter 225. It is appreciated that the resected bone perimeter 225 corresponds to an outer edge of the resected bone surface 220 of the patient's bone, i.e. at a junction with the cortical bone outer surface 205.

After having virtually cut the bone 200 to form the resected bone surface 220, the third step 130 includes providing a library of standard implants related to the resected bone surface. In this embodiment, the provided library is populated with tibial implants 300, such as tibial components of a knee replacement implant, for example. Each standard implant 300 includes an outer surface 305 and a bone-contacting surface 320, opposite the outer surface 305, configured to effectively rest upon the resected bone surface 220 of the bone 200. The outer surface 305 includes an outer surface perimeter 310 and a lateral surface 315 extending between the outer surface perimeter 310 and the bone-contacting perimeter 325. The bone-contacting surface 320 is delimited by a corresponding bone-contacting perimeter 325 which delimits a bone-contacting surface area 330. In a non-limitative embodiment wherein the lateral surface 315 extends perpendicular to the bone-contacting surface 320, the outer surface perimeter 310 is in register with the bone-contacting perimeter 325.

The fourth step 140 includes choosing a standard implant from the provided library based on the 3D model of the patient's bone. In an embodiment, the standard implant is selected from the library after defining the resected bone surface 220. The selected standard implant 300 can be selected based on the difference between the resected surface area 230 and the bone-contacting surface area 330. More particularly, the standard implant 300 is chosen in a manner such that the bone-contacting surface area 330 is smaller than the resected surface area 230. In some embodiments, the computer program can be adapted to select one or more standard implants 300 based on the 3D model (e.g., based on the shape and size of the resected bone surface 220), or alternatively, the standard implant 300 can be selected by a user.

Once the standard implant 300 has been selected, the fifth step 150 includes virtually superposing the bone-contacting surface area 330 of the selected standard implant 300 to the resected bone surface 220 of the patient's bone 200 in a selected configuration. More specifically, in the selected configuration, the standard implant 300 is positioned in a manner such that the bone-contacting perimeter 325 of the bone-contacting surface 320 is aligned with or located inwardly of the resected bone perimeter 225, therefore preventing any part of the selected standard implant from extending beyond the bone (i.e., beyond the resected bone perimeter 225). As best seen in FIG. 2, the selected standard implant 300 is superposed to the resected surface area 230 of the tibial plateau. It is appreciated that, with the bone-contacting perimeter 325 being contained within the resected bone perimeter 225, an exposed bone resected surface area 240 is defined between said perimeters 225, 325. The exposed surface area 240 is a portion of the resected bone surface 220 which is uncovered by the selected standard implant 300 when the latter is superposed to the resected bone surface 220 in the selected configuration. In some embodiments, the computer program can provide a user interface which allows the user to visualize the selected standard implant on the 3D model of the resected bone surface 220 in the selected configuration. The interface can include controls which allow the user to position the standard implant 300 and related components (e.g., fasteners) on the patient's bone and customize parameters of the implant and components.

It should be understood that the fifth step of superposing the selected standard implant to the resected bone surface 220 (i.e., step five 150) can include various manipulations of the standard implant, such as adjusting an orientation thereof in a three-dimensional space relative to the resected bone surface 220 until the selected configuration is reached. Moreover, the orientation of the standard implant 300 can be adjusted based on other elements, for example, an adjacent bone or adjacent implant. As illustrated in FIG. 3, the selected standard implant 300 can be a tibial component configured to receive or contact a spacer 340. For instance, the tibial component is made of a biocompatible metal (including alloys) and superposable against the resected bone surface 220. It includes a recess 345 configured to receive the spacer 340, which can be plastic-based (for instance, polyethylene), and is designed to fit between the tibial implant and the femur or a femoral implant. Thus, the selected standard implant 300 can be positioned relative to a femoral implant (not shown) (e.g., a femoral component of the knee replacement implant) configured to cooperate with the selected standard implant 300 or directly with the femur. It should thus be understood that, for the illustrated tibial implant, the adjacent bone is the patient's femoral bone. It is appreciated that if the implant is conceived for another bone than the tibia, the reciprocating bone of the articulation will be different.

It is appreciated that the steps of selecting the standard implant from the library and virtually superposing the selected standard implant onto the resected bone surface can be iterative. For instance, a first selected standard implant, having a bone-contacting surface area 330 smaller than the resected surface area 230, can be virtually superposed onto the bone-contacting surface but it cannot be configured or positioned in a configuration wherein the bone-contacting perimeter 325 of the bone-contacting surface 320 is aligned with or located inwardly of the resected bone perimeter 225 and/or a configuration wherein an articular surface of the selected standard implant is suitable for its intended purpose. Therefore, this first selected standard implant must be rejected, and a second standard implant may be selected from the library and virtually superposed onto the resected bone surface. The same steps can be carried out until all criteria are substantially met. It should be noted that, once all criteria are met, the resection of the patient's bone is simultaneously validated, and the method may proceed to subsequent steps. However, if none of the standard implants from the library can be positioned upon the resected surface bone surface 220, then the virtual resection of the patient's bone may have to be re-performed.

With the standard implant 300 in the selected position, a custom implant peripheral portion 350 is designed virtually (step six 160). The peripheral portion 350 is shaped and configured to extend peripherally from the selected implant 300 which is virtually engaged with the resected bone surface 220, i.e. the bone-contacting surface 320 of the implant 300 and the resected bone surface 220 are juxtaposed in the selected configuration. As illustrated in FIGS.

3 and 4, the peripheral portion 350 extends from the lateral surface 315 of the selected implant 300, extending between the outer surface perimeter 310 and the bone-contacting perimeter 325, to the resected bone perimeter 225. In the embodiment shown in FIGS. 3 and 4, the custom implant peripheral portion 350 has a substantially triangular cross-section. The exposed implant surface 380 can be designed to conform to the patient's bone and is thus aligned with an outer surface of the patient's bone 200, as it will be explained in more details below. In this embodiment, the peripheral portion 350 contacts and entirely covers the exposed resected bone surface 220, although it is appreciated that other configurations are possible. Furthermore, in the embodiment shown, the peripheral portion 350 also contacts and entirely covers the lateral surface 315 of the standard implant 300. In an embodiment, a peripheral edge 355 of the peripheral portion 350 is in register with the resected bone perimeter 225, which also corresponds to the junction with the cortical bone outer surface 205. Similarly, an articular edge 365 of the peripheral portion 350 is in register with the outer surface perimeter 310 of the standard implant 300.

Thus, the peripheral portion 350 has a lateral surface 360 juxtaposed to the lateral surface 315 of the standard implant 300 and covering same and a bone-contacting surface 370 juxtaposed to the exposed resected bone surface 220 and covering same. It also includes an exposed implant surface 380 extending between the outer surface perimeter 310 and the resected bone perimeter 225.

In the non-limitative embodiment shown, the lateral surface 360 and the bone-contacting surface 370 of the peripheral portion 350 are substantially planar but it is appreciated that other shapes and configurations can be foreseen. In the non-limitative embodiment shown, the bone-contacting surface 370 of the peripheral portion 350 extends in a same plane than the bone-contacting surface 320 of the standard implant 300.

In some embodiments, the bone-contacting perimeter 325 is completely contained within the resected bone perimeter 225 such that the designed peripheral portion 350 surrounds the standard implant 300 and has a closed perimeter (e.g., the peripheral portion 350 has an annular shape). However, in other embodiments, a portion of the bone-contacting perimeter 325 is aligned with the resected bone perimeter 225 such that the designed peripheral portion 350 only partially surrounds the standard implant 300 (e.g., the peripheral portion 350 has a generally C-shape or U-shape).

In some embodiments, the computer program can provide controls which allow the user to further adjust the shape of the custom implant peripheral portion 350, while also allowing the user to select other peripheral portion parameters. For instance, and without being limitative, the shape including the curvature of the exposed implant surface 380 of the peripheral portion 350 can be adjusted in manner that it is not a flat surface extending between its two opposed edges but it can include a curvature, such as a convex curvature, for example. With reference to FIG. 4, in this implementation, the custom implant peripheral portion 350 can be designed with a first exposed implant surface 380a extending between the peripheral edge 355 and the articular edge 365. As illustrated, the shape of the exposed implant surface 380 can be adjusted to a second exposed implant surface 380b, which conforms to a more natural curvature of the patient's bone and selected standard implant (e.g., the exposed implant surface 380 is adjusted to be in register with the patient's bone and standard implant). Once the shape and configuration of the peripheral portion 350 have been finalized, the computer program can generate a 3D model of the peripheral portion 350. As can be appreciated, the contours of the peripheral portion 350 in the generated 3D model can be configured to conform to the contours of the surfaces of the patient's bone (i.e., conform to the resected bone perimeter 225) and internal surfaces of the selected standard implant 300 (i.e., to the outer surface perimeter 310).

Once the custom implant peripheral portion 350 has been designed, it can be virtually combined with the selected standard implant 300 to create a 3D model of a patient-specific implant 10 (step seven 170). Once the 3D model of the patient-specific implant 10 is created, the model can be sent to a manufacturing unit or device to effectively manufacture the patient-specific implant 10. In some embodiments, the 3D models can be used to direct additive manufacturing techniques, such as 3D printing, to physically create the patient-specific implant 10. However, it is appreciated that other methods of manufacturing the patient-specific implant 10 are possible, such as via a milling process, where the implant 10 is refined/machined out of a block of material such as metal, for example. It should be understood that the block of material out of which the patient-specific implant is machined is initially larger in size than the designed implant. As such, the entirety of the implant (i.e., 100% of the implant) is formed from this large block of material.

Alternatively, the patient-specific implant 10 can be preliminarily formed, and subsequently refined using machining techniques and tools. The preliminary formed implant can be 3D printed, or created using any other suitable method, such as via a moulding process. In an embodiment, the preliminarily formed implant is shaped and sized based on the selected standard implant from the designing method, but includes excess material around a periphery thereof. For example, the preliminarily formed standard implant can be between 10% to 20% larger than the selected standard implant (i.e., from the library of standard implants), although it is appreciated that other sizes for the preliminarily formed standard implant are possible and may be used. The manufacturing process thus includes machining the periphery of the preliminarily formed implant in order to correspond to the designed patient-specific implant. More specifically, the preliminarily formed implant is machined in a manner where its periphery corresponds to the designed peripheral portion of the patient-specific implant. It should be noted that refining a preliminarily formed (e.g., printed or moulded) component can reduce the time and costs related to manufacturing, among other advantages. It is thus appreciated that, in some embodiments, the patient-specific implant 10 can be manufactured as a one-piece unit (e.g., 3D printed or moulded), although it is appreciated that other configurations are possible. For example, the standard implant 300 and the custom implant peripheral portion 350 can be manufactured as separate components and subsequently connected to one another.

It will be appreciated from the foregoing disclosure that there is provided a method for designing a customized (i.e., patient-specific) implant using a standard implant and creating a peripheral portion connected therewith for engaging a resection section of at least a portion of an articulation of a bone. Although the exemplary design method described above was in connection with a tibial implant, it is appreciated that similar steps can apply for designing a patient-specific implant for other parts of the body and/or for other purposes.

What is claimed is:

1. A method for designing a patient-specific implant for a patient's bone, the method comprising:
    obtaining a 3D model of at least an articulation portion of the patient's bone;
    virtually cutting the 3D model of the articulation portion of the patient's bone for defining a resected bone surface having a resected bone perimeter delimitating a resected surface area;
    providing a library of standard implants wherein each one of the standard implants is characterized by a lateral surface and a bone-contacting surface, the bone-contacting surface being delimited by a bone-contacting perimeter defining a bone-contacting surface area and the lateral surface extending between the bone-contacting perimeter and an outer surface perimeter;
    selecting a standard implant from the library of standard implants based on the 3D model in a manner such that the bone-contacting surface area of the selected standard implant is smaller than the resected surface area of the resected bone surface;
    virtually superposing the bone-contacting surface area of the selected standard implant to the resected bone surface of the articulation portion of the patient's bone in a manner such that the bone-contacting perimeter of the bone-contacting surface of the selected standard implant is aligned with or located inwardly of the resected bone perimeter and such that a portion of the resected surface area remains exposed upon virtually superposing the bone-contacting surface area of the selected standard implant to the resected bone surface, thereby defining an exposed resected bone surface area;
    designing a custom implant peripheral portion configured to engage and extend peripherally from the selected standard implant virtually engaged with the resected bone surface of the articulation portion of the patient's bone, the custom implant peripheral portion being a separate component to the selected standard implant and being designed to engage and extend outwardly from the lateral surface of the selected standard implant to the resected bone perimeter such that the custom implant peripheral portion engages and covers the exposed resected bone surface area; and
    virtually combining the selected standard implant and the designed custom implant peripheral portion to create a 3D model of the patient-specific implant.

2. The method according to claim 1, wherein virtually superposing the bone-contacting surface area of the selected standard implant to the resected bone surface of the articulation portion comprises adjusting an orientation of the selected standard implant relative to at least one of the resected bone surface, an adjacent bone and an adjacent implant.

3. The method according to claim 2, wherein the patient's bone is a tibial bone, and wherein the selected standard implant is a tibial component of a knee replacement implant.

4. The method according to claim 1, wherein the patient-specific implant is manufactured as a one-piece unit.

5. The method according to claim 1, wherein the patient-specific implant is manufactured via an additive manufacturing process or via a milling process based on the created 3D model of the patient-specific implant.

6. The method according to claim 1, wherein designing the custom implant peripheral portion comprises designing the custom implant peripheral portion to cover the lateral surface of the selected standard implant.

7. The method according to claim 1, wherein designing the custom implant peripheral portion comprises adjusting a curvature of an exposed implant surface of the custom implant peripheral portion, the exposed implant surface extending between the outer surface perimeter of the selected standard implant virtually superposed to the resected bone surface and the resected bone perimeter.

8. The method according to claim 7, wherein the designed custom implant peripheral portion comprises:
    a custom lateral surface configured to engage and cover the lateral surface of the selected standard implant, the custom lateral surface comprising an articular edge in register with the outer surface perimeter; and
    a custom bone-contacting surface configured to engage and cover the exposed resected bone surface, the custom lateral surface comprising a peripheral edge in register with the resected bone perimeter,
    and wherein the exposed implant surface extends between the articular edge and the peripheral edge.

9. The method according to claim 1, wherein the bone-contacting perimeter of the selected standard implant is completely contained within the resected bone perimeter such that the designed custom implant peripheral portion surrounds the selected standard implant and has a closed perimeter.

10. A computer system configured to:
    obtain a 3D model of at least an articulation portion of a patient's bone;
    virtually cut the 3D model of the articulation portion of the patient's bone to define a resected bone surface having a resected bone perimeter delimitating a resected surface area;
    provide a library of standard implants wherein each one of the standard implants is characterized by a lateral surface and a bone-contacting surface, the bone-contacting surface being delimited by a bone-contacting perimeter defining a bone-contacting surface area and the lateral surface extending between the bone-contacting perimeter and an outer surface perimeter;
    select a standard implant from the library of standard implants based on the 3D model in a manner such that the bone-contacting surface area of the selected standard implant is smaller than the resected surface area of the resected bone surface;
    virtually superpose the bone-contacting surface area of the selected standard implant to the resected bone surface of the articulation portion of the patient's bone in a manner such that the bone-contacting perimeter of the bone-contacting surface of the selected standard implant is aligned with or located inwardly of the resected bone perimeter and such that a portion of the resected surface area remains exposed once the bone-contacting surface area of the selected standard implant is virtually superposed to the resected bone surface, thereby defining an exposed resected bone surface area;
    design a custom implant peripheral portion configured to extend peripherally from the selected standard implant virtually engaged with the articulation portion of the patient's bone, the custom implant peripheral portion being a separate component to the selected standard implant and being designed to extend outwardly from the lateral surface of the selected standard implant to the resected bone perimeter such that the custom implant peripheral portion engages and covers the exposed resected bone surface area;

virtually combine the selected standard implant and the designed custom implant peripheral portion to create a 3D model of a patient-specific implant; and transmit instructions to a manufacturing device to manufacture the patient-specific implant.

11. The computer system according to claim 10, further comprising a user interface device for receiving commands from a user to adjust the patient-specific implant.

12. A non-transitory computer-readable medium having instructions stored thereon which, when executed by a computer, cause the computer to perform the steps of:

obtaining a 3D model of at least an articulation portion of a patient's bone;

virtually cutting the 3D model of the articulation portion of the patient's bone for defining a resected bone surface having a resected bone perimeter delimitating a resected surface area;

providing a library of standard implants wherein each one of the standard implants is characterized by a lateral surface and a bone-contacting surface, the bone-contacting surface being delimited by a bone-contacting perimeter defining a bone-contacting surface area and the lateral surface extending between the bone-contacting perimeter and an outer surface perimeter;

selecting a standard implant from the library of standard implants based on the 3D model in a manner such that the bone-contacting surface area of the selected standard implant is smaller than the resected surface area of the resected bone surface;

virtually superposing the bone-contacting surface area of the selected standard implant to the resected bone surface of the articulation portion of the patient's bone in a manner such that the bone-contacting perimeter of the bone-contacting surface of the selected standard implant is aligned with or located inwardly of the resected bone perimeter and such that a portion of the resected surface area remains exposed once the bone-contacting surface area of the selected standard implant is virtually superposed to the resected bone surface, thereby defining an exposed resected bone surface area;

designing a custom implant peripheral portion configured to extend peripherally from the selected standard implant virtually engaged with the articulation portion of the patient's bone, the custom implant peripheral portion being a separate component to the selected standard implant and being designed to extend outwardly from the lateral surface of the selected standard implant to the resected bone perimeter such that the custom implant peripheral portion engages and covers the exposed resected bone surface area;

virtually combining the selected standard implant and the designed custom implant peripheral portion to create a 3D model of a patient-specific implant; and transmitting instructions to a manufacturing device to manufacture the patient-specific implant.

* * * * *